US012715313B2

(12) United States Patent
Stewart et al.

(10) Patent No.: US 12,715,313 B2
(45) Date of Patent: Aug. 25, 2026

(54) SYSTEM AND METHOD FOR BATTERY MODULE REPLACEMENT

(71) Applicant: THE TORO COMPANY, Bloomington, MN (US)

(72) Inventors: Chad A. Stewart, Hastings, MN (US); Kent L. Eastlick, Maple Grove, MN (US)

(73) Assignee: THE TORO COMPANY, Bloomington, MN (US)

( * ) Notice: Subject to any disclaimer, the term of this patent is extended or adjusted under 35 U.S.C. 154(b) by 1191 days.

(21) Appl. No.: 17/702,024

(22) Filed: Mar. 23, 2022

(65) Prior Publication Data

US 2022/0305922 A1 Sep. 29, 2022

Related U.S. Application Data

(60) Provisional application No. 63/165,349, filed on Mar. 24, 2021.

(51) Int. Cl.

*B60L 50/60* (2019.01)
*B60L 53/30* (2019.01)
*B60L 53/80* (2019.01)
*H01M 50/20* (2021.01)
*H02J 7/50* (2026.01)
*B60K 1/04* (2019.01)

(52) U.S. Cl.

CPC ............ *B60L 50/66* (2019.02); *B60L 53/305* (2019.02); *B60L 53/80* (2019.02); *H01M 50/20* (2021.01); *H02J 7/50* (2026.01); *B60K 2001/0494* (2013.01)

(58) Field of Classification Search

CPC ........ B60L 50/66; B60L 53/305; B60L 53/80; B60L 2240/547; B60L 2240/549; B60L 3/0046; B60L 58/21; H01M 50/20; H01M 10/4207; H01M 10/441; H02J 7/0013; H02J 1/001; H02J 7/00032; B60K 2001/0494; B60K 2001/0455; B60K 1/04; Y02E 60/10

See application file for complete search history.

(56) References Cited

U.S. PATENT DOCUMENTS

2013/0334881 A1* 12/2013 Jones .................... H05B 47/11 307/23
2016/0322839 A1* 11/2016 Fan ...................... H02J 7/0014
2017/0207430 A1* 7/2017 Conrad .............. H01M 50/296

* cited by examiner

*Primary Examiner* — Jack Chiang
*Assistant Examiner* — Brandon Bowers
(74) *Attorney, Agent, or Firm* — Mueting Raasch Group

(57) ABSTRACT

Systems and methods for replacing one or more battery modules of a battery pack include using one or more communication devices to instruct a battery management system of the battery pack that a number of battery modules of the battery pack is equal to a remaining number of battery modules in the battery pack after one or more battery modules have been disconnected. The remaining battery modules of the battery pack may be charged to any voltage within a nominal voltage range while the one or more communication devices are coupled to the battery pack.

10 Claims, 8 Drawing Sheets

102
106
108-1
108-2
112-1
112-2
110-1
110-2

104
130
132-1
132-2
134

Replacement Battery 116
Charger 114
Communication Device(s) 118
Adapter 122
Jumper(s) 120
Battery Pack 100
BMS 102
Battery 104-1
Battery 104-2
Battery 104-3
Battery 104-N Battery Pack
100
BMS
102
Battery
104-1
Replacement Battery
116
Battery
104-3
Battery
104-N

SYSTEM AND METHOD FOR BATTERY MODULE REPLACEMENT

The present application claims priority to and/or the benefit of U.S. Provisional Patent Application No. 63/165,349, filed 24 Mar. 2021, which is incorporated herein by reference in its entirety.

Embodiments of the present disclosure relate to battery packs and, more particularly, to battery packs for use with indoor and outdoor power equipment (e.g., lawn mowers, utility loaders, and the like).

BACKGROUND

Power equipment units are well-known in both consumer and professional markets alike. While not an exhaustive list, such equipment may include walk-behind and riding lawn mowers, snow throwers, hand-held and body-carried devices such as trimmers, other vehicles such as stand-on and walk-behind compact utility loaders, and other indoor and outdoor equipment. Such equipment is available in a wide range of sizes and configurations to accommodate particular end-user needs. For example, lawn mowers may be configured as walk-behind or ride-on vehicles having grass cutting decks of varying cutting widths. To power the deck, as well as an optional propulsion system, such mowers may include an internal combustion engine.

More recently, power equipment units incorporating one or more battery-powered electric motors in place of the internal combustion engine have grown in popularity. Such vehicles typically include a re-chargeable battery pack to power the motor(s) during operation.

SUMMARY

Embodiments described herein may provide a method for replacing one or more battery modules of a battery pack. The method may include disconnecting the one or more battery modules of the battery pack from the battery pack, instructing a battery management system of the battery pack that a number of battery modules of the battery pack is equal to a remaining number of battery modules in the battery pack after the one or more battery modules have been disconnected, and charging each remaining battery module in the battery pack to any voltage within a nominal voltage range.

In other embodiments, a method is provided for replacing a battery module of a battery pack. The method may include disconnecting the battery module of the battery pack from the battery pack, instructing a battery management system of the battery pack that the battery pack comprises one less battery module, and charging each remaining battery module in the battery pack to any voltage within a nominal voltage range.

In other embodiments, a method is provided for replacing one or more battery modules of a battery pack. The method may include charging a replacement battery module to a voltage within the nominal voltage range, instructing the battery management system, after charging each remaining battery modules in the battery pack to a voltage within the nominal voltage range, that the battery pack comprises one more battery module, and connecting the replacement battery module to the battery pack after instructing the battery management system that the battery pack comprises the one more battery module.

In other embodiments, a method is provided for replacing one or more battery modules of a battery pack. The method may include charging one or more replacement battery modules to any voltage within a nominal voltage range, disconnecting the one or more battery modules from the battery pack comprising disconnecting the one or more battery modules from a battery management system of the battery pack, operatively coupling one or more communication devices to the battery pack, charging each remaining battery module in the battery pack to any voltage within the nominal voltage range, disconnecting the one or more communication devices from the battery pack, and connecting the one or more replacement battery modules to the battery pack after disconnecting the one or more communication devices from the battery pack In other embodiments, a battery module replacement system is provided to replace one or more battery modules of a battery pack. The battery module replacement system may include an adapter and a jumper. The adapter may operatively couple to a battery management system of the battery pack and instruct the battery management system that a number of battery modules of the battery pack is equal to a remaining number of battery modules in the battery pack after the one or more battery modules have been disconnected from the battery pack. The jumper may complete a communication interface of the battery pack when the one or more battery modules have been disconnected.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
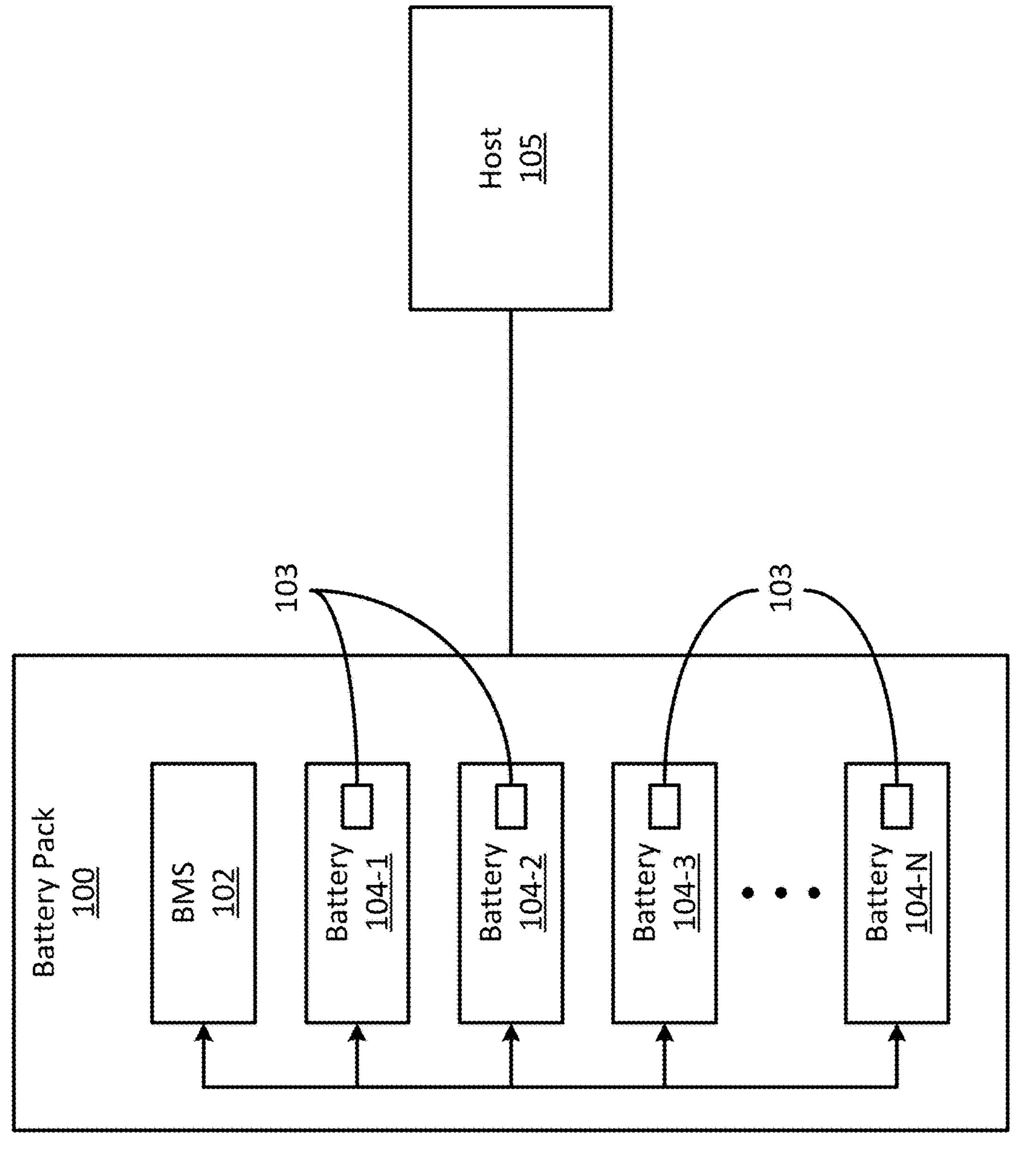
FIG. 1 is a schematic block diagram of an exemplary battery pack.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est and means "that is," while "e.g.," may be used as an abbreviation for the Latin phrase exempli gratia and means "for example."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure. These terms are used only to simplify the description, however, and not to limit the interpretation of any embodiment described.

Embodiments of the present disclosure are directed to systems and methods for replacing one or more battery modules of battery packs for an electric power equipment unit (e.g., a lawn mower). Such battery packs may include battery modules and a battery management system (BMS). Each of the battery modules may include a housing and battery cells. The BMS may be configured to keep the associated battery pack within operating parameters (e.g., maintain intended operating conditions). The BMS may be operatively coupled to each of the battery modules of the battery pack. Furthermore, the BMS may be configured to deactivate or prevent operation of the battery pack when a battery module fails or is removed from the battery pack. That is, deactivation of the BMS may prevent charging and discharging of the remaining battery packs.

The voltage of replacement battery modules may not necessarily match the voltage of the battery modules remaining in a battery pack when the BMS deactivates. To connect battery modules of some battery chemistry types, each of the battery modules may need to be within a certain voltage range of each other. The remaining battery modules and the replacement battery module may be charged to within a nominal voltage range to bring each of the battery modules to within the same voltage range. However, such a process is typically prevented when the BMS deactivates due to battery module failure or removal. To facilitate replacement of individual battery modules, embodiments of the present disclosure provide that one or more communication devices may be used to activate or turn on the BMS to allow charging of any remaining battery modules of the battery pack when one or more battery modules are removed from the battery pack.

FIG. 1 illustrates a schematic block diagram of a battery pack 100. The battery pack 100 includes BMS 102 and battery modules 104-1 through 104-N (referred to individually or collectively as battery modules 104). The terms "battery" and "battery module" may be used interchangeably herein. Battery packs such as battery pack 100 may include any number of battery modules 104. Each of the battery modules 104 may include one or more battery cells 103. The terms "battery cell" and "electrochemical cell" may be used interchangeably herein. Each of the battery modules 104 may include a housing, power terminals, and a communication interface or terminal. The battery cells 103 may be disposed within the housing. The battery modules 104 may be operatively coupled to one another and to the BMS 102. The battery modules 104 may be operatively coupled to the BMS 102 via a communication interface (e.g., a serial communication interface, parallel communication interface, etc.) and via power terminals to provide a link for power. The battery modules 104 may be operatively coupled to each other to provide a link for power and/or communication between the battery modules. The battery modules 104 may be arranged in parallel, series, or both. In other words, power terminals of the battery modules 104 may be operatively coupled to one another in various arrangements to provide parallel connections, series connections, or both.

As used herein, "operatively coupled" generally refers to a direct or indirect connection that may be wired or wireless that provides a link for power and/or communication between apparatus or systems. Wired data communication may include, or utilize, any suitable hardware connection such as, e.g., advanced microcontroller bus architecture (AMBA), ethernet, peripheral component interconnect (PCI), PCI express (PCIe), optical fiber, local area network (LAN), etc. Wireless communication may include, or utilize, any suitable wireless connection such as, e.g., Wireless Fidelity (Wi-Fi), cellular network, Bluetooth, near-field communication (NFC), optical, infra-red (IR), optical, trench bounded photons, Wireless Network-on-Chip (WNoC), etc.

The battery pack 100 may be operatively couplable to a host system 105. As used herein, "host system" may include most any system to which the battery pack is intended to connect. Exemplary, host systems may include any system or apparatus such as, for example, outdoor power equipment units, other battery packs, a battery charger, a diagnostic device, etc. As used herein, "outdoor power equipment" may include, for example, backpack-based appliances (e.g., debris blowers and trimmers), walk-behind and riding mowers, snow throwers, aerators, spreader/sprayers, compactors, trenchers, power inverters, stand-on vehicles, ride-on vehicles such as compact utility loaders, fully and semi-autonomously controlled robots, and the like for use in one or both of outdoor and indoor environments.

The BMS 102 may be configured to maintain desired operating conditions of the battery pack 100 and the battery modules 104. Furthermore, the BMS 102 may be configured to deactivate or prevent operation of the battery pack 100 when one or more of the battery modules 104 fail or are removed from the battery pack. In other words, when one or more of the battery modules 104 fail or are removed, the BMS 102 may shut down and prevent the battery modules 104 from charging or discharging. To facilitate replacement of one or more of the battery modules 104 without replacing each of battery modules 104 of the battery pack 100, one or more communication devices (described further below) may be used to activate the BMS 102 and allow the remaining battery modules that have not failed to be charged.

Figures 2A, 2B:
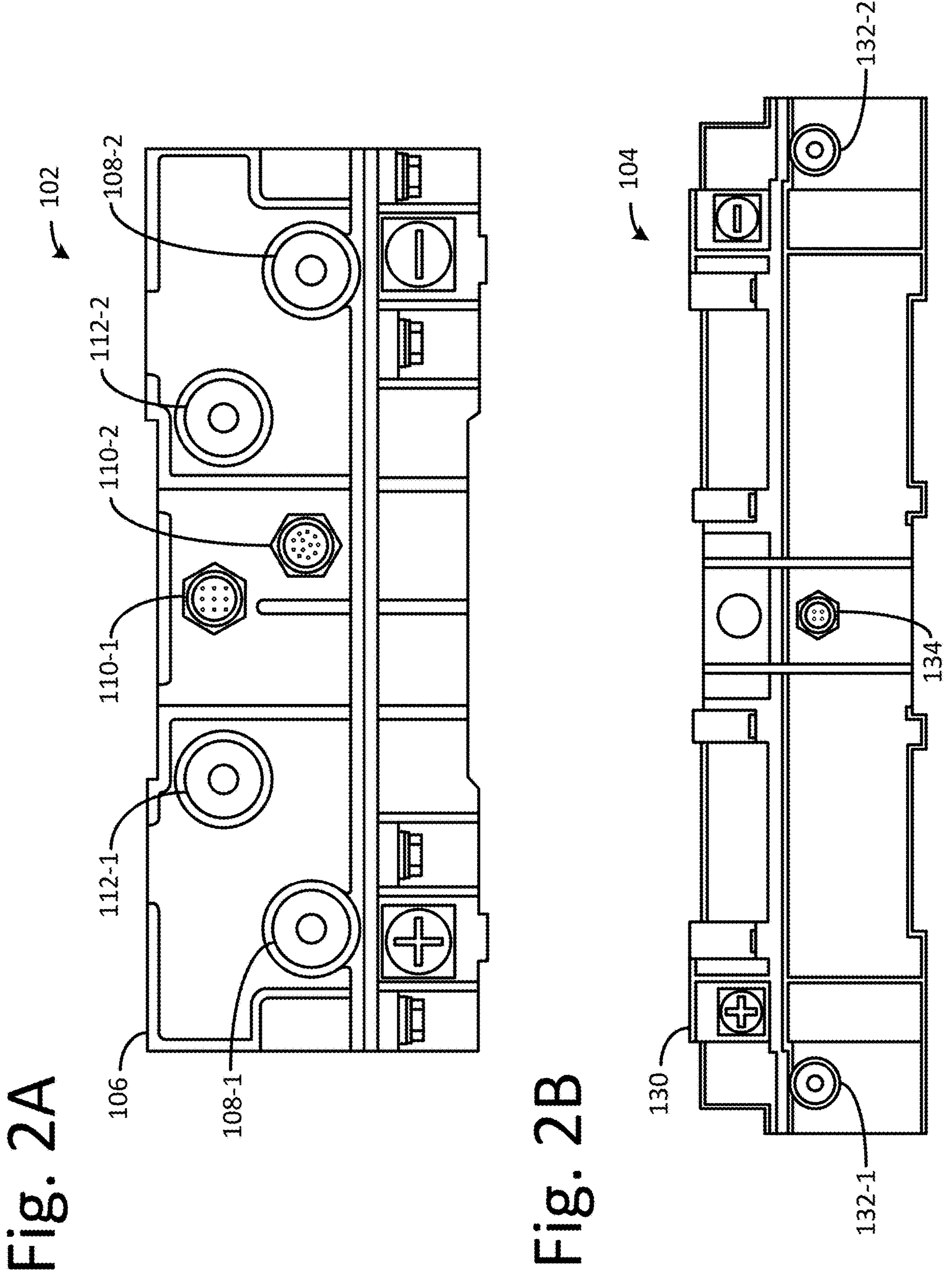
FIG. 2A is a side view of an exemplary battery management system (BMS)
FIG. 2B is a side view of an exemplary battery module.

FIG. 2A illustrates a side view of a battery management system (BMS) 102 in accordance with embodiments of the present disclosure. As shown in this view, the BMS 102 may include a BMS housing 106, power terminals 108 (e.g., positive terminal 108-1 and negative terminal 108-2), power terminals 112 (e.g., positive terminal 112-1 and negative terminal 112-2), and communication terminals 110 (e.g., lead/support terminal 110-1, communication terminal 110-2). The BMS housing 106 may be configured, e.g., sealed, to reduce or eliminate water, dust, and/or other debris ingress. In addition, the BMS housing 106 may provide robust impact protection for the components and cells contained therein. Still further, the BMS housing 106 may be formed of electrically insulative materials adapted to prevent shorting of electrical components contained within the BMS 102.

The power terminals 108 may be used to operatively couple the BMS 102 to other devices such as, for example, the host system (see FIG. 1). The power terminals 112 may be used to operatively couple to battery modules 104 contained within the battery pack 100. Connectors (not shown) may be coupled to power terminals 108, 112 to allow the power terminals to be operatively coupled to a variety of host system power terminals or battery modules 104.

FIG. 2B illustrates a side view of a battery module 104 in accordance with embodiments of the present disclosure. As shown in this view, the battery module 104 may include a housing 130, power terminals 132 (e.g., positive terminal 132-1 and negative terminal 132-2), and communication port 134. The module housing 106 may be configured, e.g., sealed, to reduce or eliminate water, dust, and/or other debris ingress. In addition, the module housing 106 may provide robust impact protection for the components and cells contained therein. Still further, the battery module housing 106 may be formed of electrically insulative materials adapted to prevent shorting of electrical components contained within the battery module 104.

The power terminals 132 may be used to operatively couple the battery module to other battery modules and to the BMS. The power terminals 132 may provide an electrical connection to other battery modules 104 contained within the battery pack 100. Connectors (not shown) may be coupled to power terminals 132 to allow the power terminals to be operatively coupled to the BMS 102 and to other battery modules 104.

Each battery module 104 may include a plurality of cells (e.g., battery cells 103 of FIG. 1). The cells may be any suitable battery type or geometry such as, e.g., cylindrical, prismatic, pouch, etc. Furthermore, the cells may include any suitable chemistry, such as, lithium-ion, lead acid, lithium polymer, etc.

Figure 3:
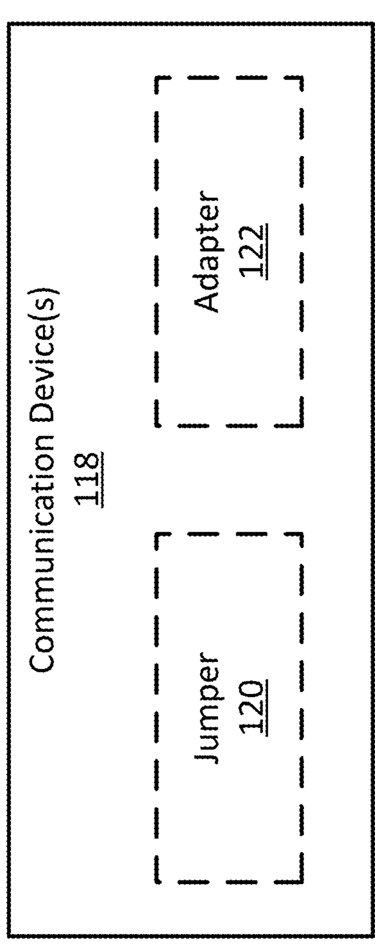
FIG. 3 is a schematic block diagram of an exemplary communication device or devices.

FIG. 3 is a schematic block diagram of an exemplary communication device or devices 118 in accordance with embodiments of the present disclosure. The communication device(s) 118 may be used to replace one or more battery modules 104 of a battery pack (e.g., battery pack 100 of FIG. 1). In other words, the communication device(s) 118 may be a battery module replacement system. The communication device(s) 118 may be configured to instruct a battery management system (e.g., BMS 102 of FIG. 1) of the number of remaining battery modules in a battery pack (e.g., battery pack 100 of FIG. 1) when one or more battery modules of a battery pack are removed. Instructing, a BMS of the number of remaining battery modules may include, for example, shorting connector pins of the BMS in a predetermined configuration based on the number of remaining battery modules, transmitting a command or instruction to the BMS, providing a code to the BMS, etc. Instructing the BMS of the number of remaining battery modules in the battery pack may activate the BMS when one or more battery modules have been removed or disconnected from the battery pack. Accordingly, activation of the BMS when one or more battery modules have been removed may allow the remaining battery modules to be charged.

In one embodiment, the communication device(s) 118 may include a jumper 120 and an adapter 122. The jumper 120 may be configured to complete a communication interface of the battery pack 100 when one or more battery modules 104 have been disconnected from a battery pack. The jumper 120 may be configured to complete any suitable communication interface including, for example, a serial communication interface, a parallel communication interface, a synchronous communication interface, an asynchronous communication interface, etc.

The adapter 122 may be configured to operatively couple to a BMS of a battery pack (e.g., battery pack 100 of FIG. 1) and instruct the BMS that the number of battery modules of the battery pack is equal to a remaining number of battery modules in the battery pack after one or more battery modules have been disconnected from the battery pack. The adapter 122 may include any suitable circuitry or devices to operatively couple to and instruct a BMS of the number of battery modules present in a battery pack. The adapter 122 may include, for example, hard wired connections, selectable preset configurations, controllers, processors, field-programmable gate arrays (FPGAs), switches, pins, connectors, etc.

Wired connections may include the pins of a connector for operatively coupling to a BMS being shorted together in a predetermined configuration. The shorted pins may act as a jumper between inputs or pins of the BMS that instruct the BMS of a number of battery modules present in a battery pack. Such wired connections may configure the adapter 122 to a single number of battery modules. For example, the adapter 122 may include wired connections configured to instruct a BMS that there are seven battery modules in a battery pack, a different adapter may include wired connections configured to instruct the BMS that there are five battery modules in a battery pack, and still other adapters may be configured to instruct the BMS that other numbers of battery modules are in the battery pack. Other configurations of the adapter 122 may allow a single adapter to be used to instruct the BMS that any suitable number of battery modules are connected. In other words, other configurations of the adapter 122 may allow a user to select different numbers of battery modules with a single adapter.

Figure 4:
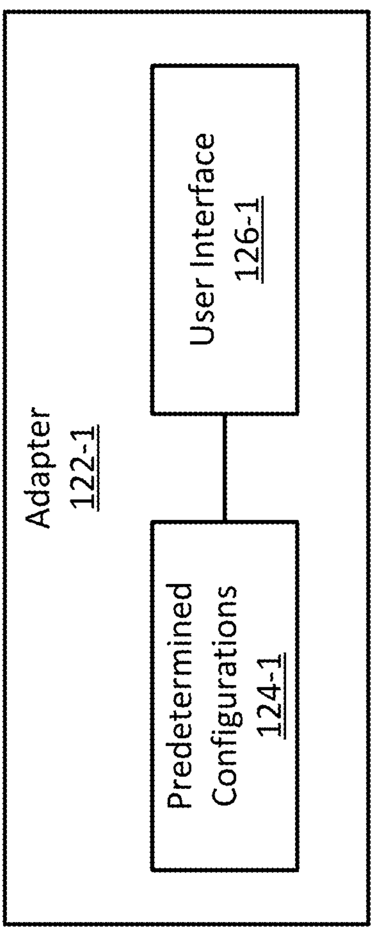
FIG. 4 is a schematic block diagram of an exemplary adapter.
Figure 5:
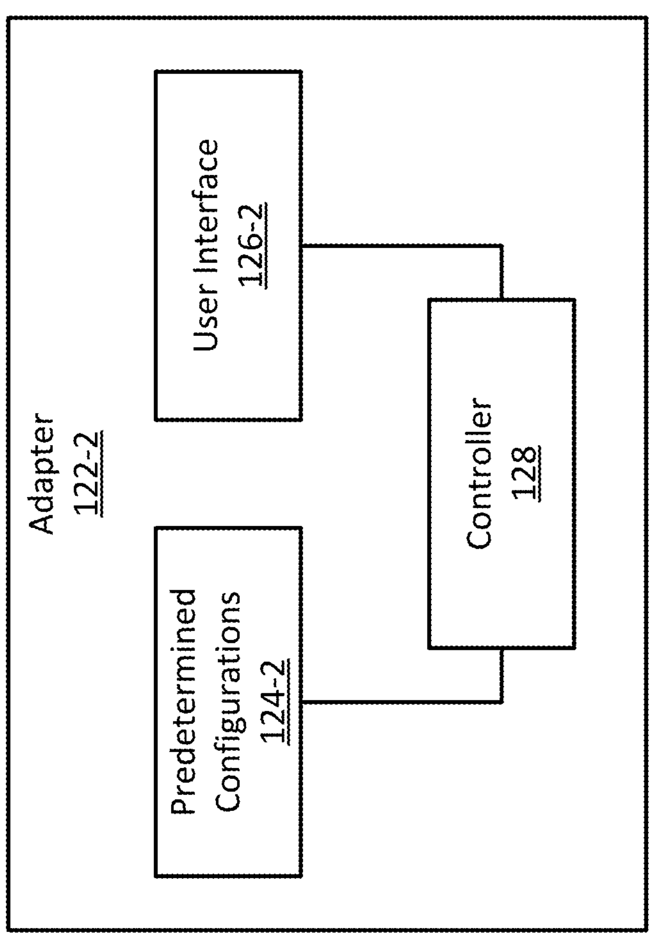
FIG. 5 is a schematic block diagram of another exemplary adapter.

FIGS. 4 and 5 schematically depict exemplary adapters 122-1, 122-2, respectively. The adapters 122-1, 122-2 may be configured to allow a user to select between predetermined configurations 124-1, 124-2 (referred to collectively as predetermined configurations 124). Each of the predetermined configurations 124 may indicate or correspond to a different number of battery modules. The adapters 122-1, 122-2 may be configured to instruct a BMS of the number of connected battery modules based on a selected one of the predetermined configurations 124.

The adapter 122-1 may include predetermined configurations 124-1 and a user interface 126-1 as shown in FIG. 4. The predetermined configurations 124-1 may include, for example, adjustable wired connections, selectable wired connections, logic circuitry, an FPGA, etc. The user interface 126-1 may be operatively coupled to the predetermined configurations 124-1 and be configured to select one of the predetermined configurations 124-1. The user interface 126-1 may include, for example, a switch, a rotary knob, a graphical user interface, etc. The user interface 126-1 may be manipulated by a user to select a desired number of battery modules. The adapter 122-1 may instruct a BMS of a battery pack that the number of connected battery modules is equal to the selected number of battery modules. To instruct the BMS of the number of connected battery modules, the predetermined configurations 124-1 may include various circuits that short connector pins of the adapter 122-1 in different configurations based on the number of battery modules selected using the user interface 126-1.

The adapter 122-2 may include predetermined configurations 124-2, a user interface 126-2, and a controller 128 as shown in FIG. 5. The predetermined configurations 124-2 may include, for example, BMS commands, BMS instructions, pin short instructions, connector pin layouts, etc. The predetermined configurations 124-2 may be stored in memory such as, for example, Read-Only Memory (ROM), non-volatile random-access memory (NVRAM), electrically erasable programmable read-only memory (EEPROM), FLASH memory, magnetic data storage media, optical data storage media, or the like.

The user interface 126-2 may be operatively coupled to the controller 128 and be configured to select one of the predetermined configurations 124-2. The user interface 126-2 may include, for example, a switch, a rotary knob, a graphical user interface, etc. The user interface 126-2 may be manipulated by a user to select a desired number of battery modules. The controller 128 may receive the selected one of the predetermined configurations 124-2 and may instruct a BMS of a battery pack that the number of connected battery modules is equal to the selected number of battery modules. To instruct the BMS of the number of connected battery modules, the controller 128 may be configured to transmit BMS commands or instructions based on the selected one of the predetermined configurations 124-2. Alternatively, the controller 128 may be configured to short connector pins based on the selected one of the predetermined configurations.

The controller 128 may include circuitry or devices to carry out processes and techniques as described herein, for example, to receive a selection that indicates the number of battery modules and to instruct a BMS of the selected number of battery modules. For example, the controller 128 may include one or more processors microprocessors, DSPs, ASICs, FPGAs, CPLDs, microcontrollers, or any other equivalent integrated or discrete logic circuitry, as well as any combinations of such components, image processing devices, or other devices. The controller 128 may further include one or more memory devices including, for example, RAM, ROM, NVRAM, EEPROM, FLASH memory, magnetic data storage media, optical data storage media, or the like.

Figure 6:
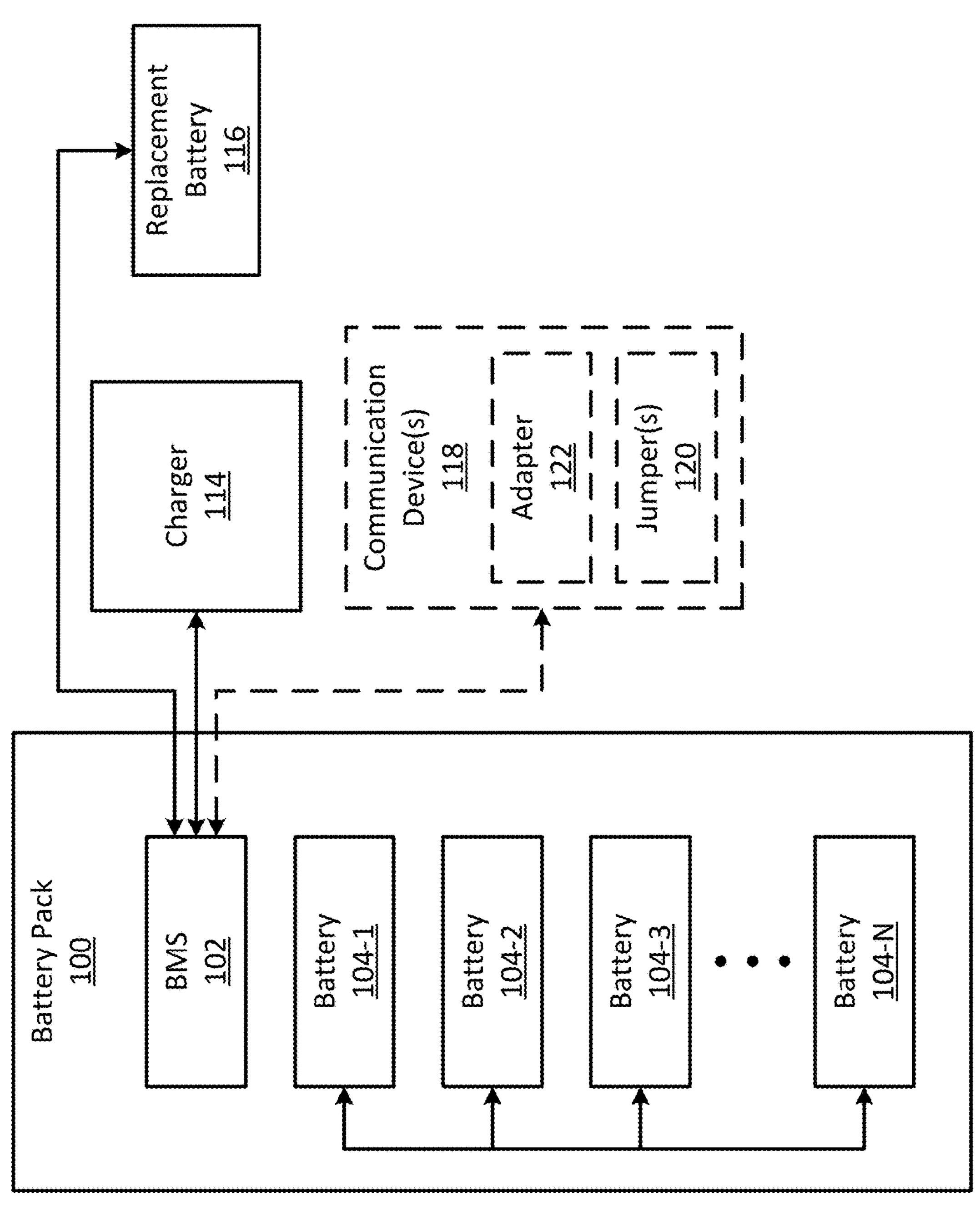
FIG. 6 is a schematic block diagram of the exemplary battery pack of FIG. 1 during charging of an exemplary replacement battery module.
Figure 7:
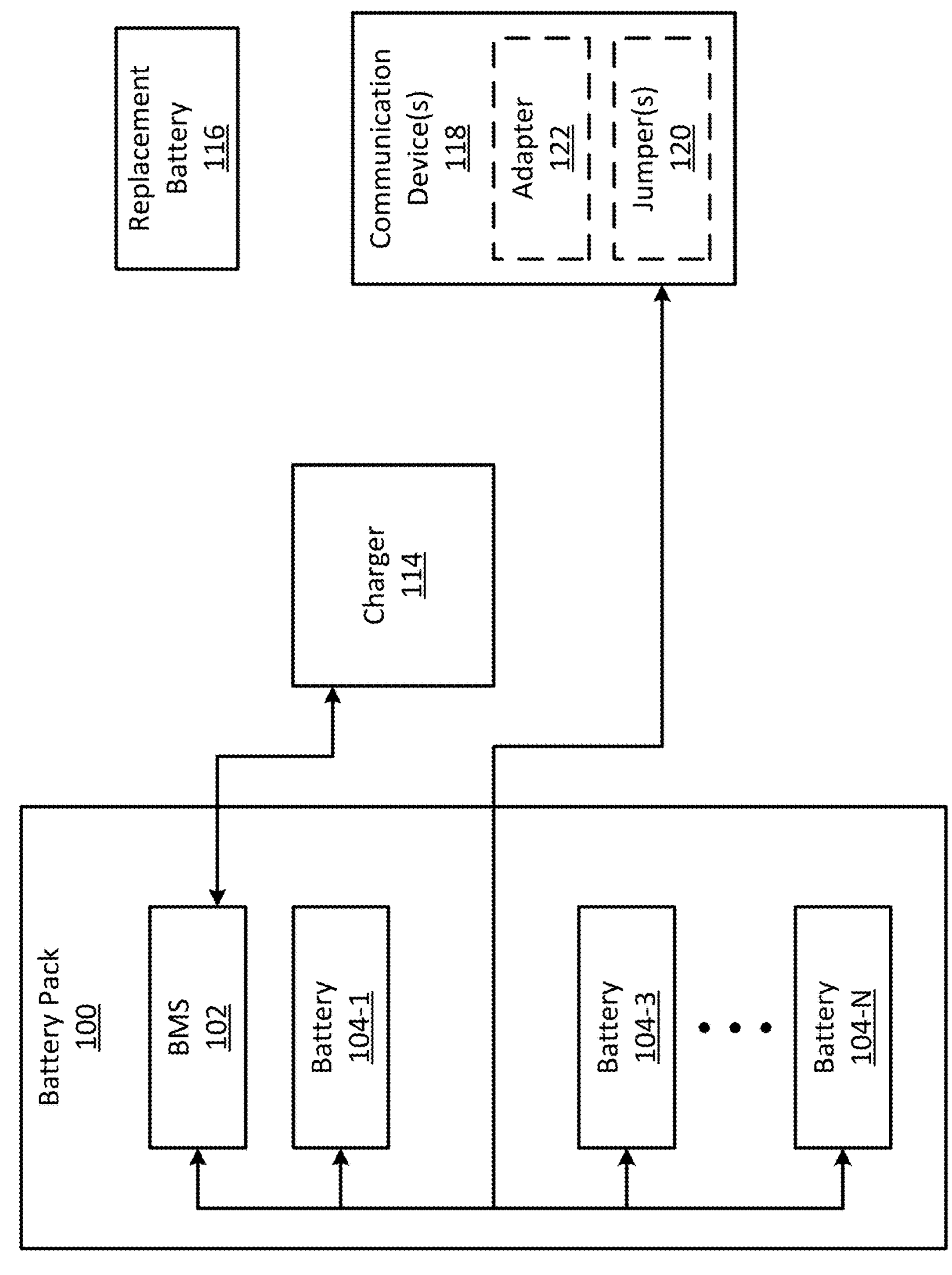
FIG. 7 is a schematic block diagram of the exemplary battery pack of FIG. 1 with a battery module removed and the remaining battery modules being charged.
Figure 8:
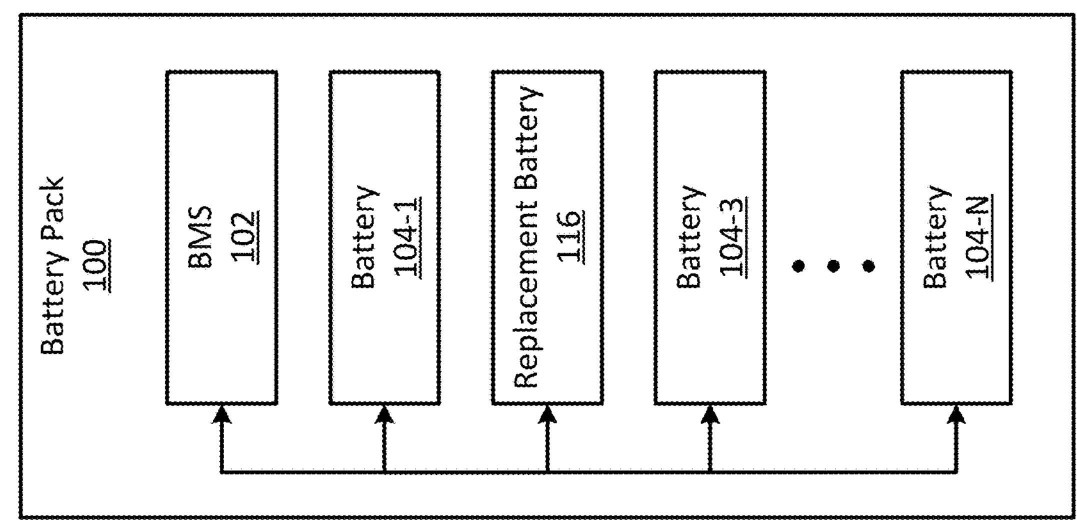
FIG. 8 is a schematic block diagram of the exemplary battery pack of FIG. 1 illustrating a replacement battery module.

The communication device(s) of FIG. 3 and the adapters 122-1, 122-2 of FIGS. 4 and 5 may allow individual battery modules of a battery pack (e.g., battery pack 100 of FIG. 1) to be replaced as shown in FIGS. 6-8. FIGS. 6-8 depict schematic block diagrams of the battery pack 100 during a battery module replacement process or method.

FIG. 6 depicts a schematic block diagram of the battery pack 100 of FIG. 1 during charging of a replacement battery module 116. To charge the replacement battery module 116, a charger 114 may be operatively coupled to the BMS 102 of the battery pack 100. The BMS 102 may provide instructions to the charger 114 for charging the replacement battery module 116. Instructions for charging may include, for example, a charging profile, a charging current, a charging voltage, a nominal voltage, a nominal voltage range, etc. The charging profile may include the charging current and the charging voltage. Additionally, the charging profile may include changes to the charging current and the charging voltage as the replacement battery module 116 is charged by the charger 114. In one embodiment, the charging current may remain constant until the replacement battery module 116 reaches a predetermined voltage. Furthermore, the BMS 102 may be operatively coupled to the replacement battery module 116 to monitor conditions of the replacement battery module including, for example, voltage, current, temperature, etc. After the replacement battery module 116 reaches a predetermined voltage, the charging voltage may remain constant and the charging current allowed to change accordingly.

The nominal voltage may be the nominal voltage of the battery modules 104 and the replacement battery module 116. The nominal voltage range of the battery modules 104 and the replacement battery module 116 may be a range that includes the nominal voltage. The nominal voltage range of the battery modules 104 may be based on a type of battery, a type of battery chemistry, a battery module data sheet, or other property of the battery modules 104 and/or the battery replacement module 116. In one embodiment, the nominal voltage range may be a range with the nominal voltage at the midpoint of the nominal voltage range. The nominal voltage range may be a range that is, for example, 50 millivolts less than the nominal voltage to 50 millivolts greater than the nominal voltage, 100 millivolts less than the nominal voltage to 100 millivolts greater than the nominal voltage, 150 millivolts less than the nominal voltage to 150 millivolts greater than the nominal voltage, 200 millivolts less than the nominal voltage to 200 millivolts greater than the nominal voltage, or 250 millivolts less than the nominal voltage to 250 millivolts greater than the nominal voltage. In one embodiment, the nominal voltage may be any voltage within the nominal voltage range.

Optionally, one or more communication device(s) 118 may be operatively coupled to the BMS 102 to activate the BMS 102 or instruct the BMS 102 that the number of connected battery modules is equal to the number of replacement battery modules when the one or more communication device(s) 118 are used to charge the replacement battery modules. As shown, there is a single replacement battery module 116. However, in some examples, there may be multiple replacement battery modules. In other words, the communication device(s) 118 may be configured to instruct the BMS 102 that one battery module is connected or that multiple battery modules are connected to allow the replacement battery modules to be charged. The number of connected battery modules may be selectable via the communication device(s) 118 or there may be a different communication device for the different numbers of connected battery modules (e.g., a communication device for one connected battery module, another for two connected battery modules, etc.). The communication device(s) 118 may optionally include an adapter 122 to instruct the BMS 102 of the number of connected battery packs and a jumper 120 to complete the communication interface.

In addition to charging the replacement battery module 116 to a voltage within the nominal voltage range, the remaining battery modules 104-1, 104-3, . . . , 104-N may be charged to a voltage within the nominal voltage range as shown in FIG. 7. FIG. 7 is a schematic block diagram of the battery pack 100 of FIG. 1 with the battery module 104-2 removed and the remaining battery modules 104-1, 104-3, . . . , 104-N being charged by the charger 114.

One or more of the battery modules 104 may be disconnected from the battery pack 100. As shown, battery module 104-2 has been disconnected from the battery pack 100 in FIG. 7. One or more communication devices 118 may be operatively coupled to the BMS 102 and the battery modules 104-1, 104-3, . . . , 104-N to instruct the BMS 102 that a number of battery modules of the battery pack 100 is equal to a remaining number of battery modules in the battery pack after one or more battery modules 104 (e.g., battery module 104-2) have been disconnected from the battery pack 100. In one embodiment, the one or more communication devices 118 may instruct the BMS 102 that the battery pack 100 includes one less battery module (e.g., when only one of the battery modules 104 is replaced). Although only battery module 104-2 is shown being replaced, exemplary systems and methods described herein may be used to replace any number of battery modules of a battery pack. For example, the communication device(s) 118 may be configured to instruct the BMS 102 that the number of battery modules in the battery pack is equal to the total number of battery modules before disconnecting one or more battery modules minus the number of battery modules disconnected from the battery pack.

The communication device(s) 118 may optionally include a jumper 120 and an adapter 122. The jumper 120 may be operatively coupled to the battery pack 100 and may be configured to complete a communication interface of the battery pack after one or more battery modules 104 (e.g., battery module 104-2) have been disconnected from the battery pack 100. The adapter 122 may be operatively coupled to the BMS 102 to instruct the BMS 102 that a number of battery modules 104 of the battery pack 100 is equal to a remaining number of battery modules in the battery pack 100 after the one or more battery modules (e.g., battery module 104-2) have been disconnected from the battery pack. The adapter 122 may include any of the adapters 122, 122-1, 122-2 as described herein.

Each of the remaining battery modules 104-1, 104-3, . . . , 104-N in the battery pack 100 may be charged to any voltage within the nominal voltage range. The charger 114 may be operatively coupled to the BMS 102 and the battery modules 104-1, 104-3, . . . , 104-N. The BMS 102 may provide instructions to the charger 114 for charging the battery modules 104-1, 104-3, . . . , 104-N. The charger 114 may be configured to charge battery modules 104-1, 104-3, . . . , 104-N based on the instructions received from the BMS 102. The BMS 102 may monitor various conditions of the battery modules 104-1, 104-3, . . . , 104-N during charging and provide instructions to the charger 114 based on such conditions. Conditions of the battery modules 104-1, 104-3, . . . , 104-N may include, for example, battery module voltage, temperature, state of charge, etc.

When both the replacement battery module 116 and the remaining battery modules 104-1, 104-3, . . . , 104-N have been charged to a voltage within the nominal voltage range, the battery pack may be put back together as shown in FIG. 8. FIG. 8 is a schematic block diagram of the exemplary battery pack of FIG. 1 with the replacement battery module 116 installed or connected in the place of the battery module 104-2.

After the remaining battery modules 104-1, 104-3, . . . , 104-N have been charged the BMS 102 may be instructed that the number of battery modules in the battery pack is equal to the number of remaining battery modules plus any replacement battery modules (e.g., replacement battery module 116). In one embodiment, the BMS 102 may be instructed that the battery pack 100 includes one more battery module 104 (e.g., when only one of the battery modules 104 is replaced). To instruct the BMS 102 that the number of battery modules in the battery pack 100 is equal to the number of remaining battery modules (e.g., battery modules 104-1, 104-3, . . . , 104-N) plus the one or more replacement battery modules (e.g., replacement battery module 116) the communication device(s) 118 may be removed from the battery pack 100. Removing the communication device(s) 118 from the battery pack may include disconnected the adapter 122 from the BMS 102 and disconnecting the jumper 120 from the battery pack 100.

The one or more replacement battery modules (e.g., replacement battery module 116) may be connected to the battery pack 100 after instructing the BMS 102 that the number of battery modules in the battery pack 100 is equal to the number of remaining battery modules plus the one or more replacement battery modules.

As shown in FIGS. 6-8, replacement battery module 116 is charged, battery module 104-2 is disconnected from the battery pack 100, the remaining battery modules 104-1, 104-3, . . . , 104-N are charged, and the replacement battery connected in place of battery module 104-2. Although only one battery module (e.g., battery module 104-2) is replaced in this example, the systems and techniques described herein may be used to replace multiple battery modules of a battery pack. For example, the communication device(s) 118 may be selected or configured to instruct the battery management system that the number of battery modules (R) is equal to the total number of battery modules (N) of the battery pack minus the number of disconnected battery modules (D). In other words, the communication device(s) 118 may be selected or configured based on Equation 1 as follows:

$$R=N-D \quad \text{(Equation 1)}$$

Additionally, the communication device(s) 118 may include a number of jumpers 120 equal to the number of disconnected battery modules (D). Such jumpers 120 may complete the communication interface between the battery modules 104. Accordingly, any number of battery modules of a battery pack may be replaced using the systems and techniques described herein.

The techniques described in this disclosure, including those attributed to the communication devices, or various constituent components, may be implemented, at least in part, in hardware, software, firmware, or any combination thereof. For example, various aspects of the techniques may be implemented by the communication devices (e.g., communication device(s) 115 as described herein), which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus to support one or more aspects of the functionality described in this disclosure.

Illustrative embodiments are described and reference has been made to possible variations of the same. These and other variations, combinations, and modifications will be apparent to those skilled in the art, and it should be understood that this invention is not limited to the illustrative embodiments set forth herein.

What is claimed is:

1. A method for replacing one or more battery modules of a battery pack when failure of the one or more battery modules causes a battery management system controlling the battery pack to deactivate thereby preventing the battery management system from charging the battery pack, the method comprising:

- disconnecting the one or more battery modules from a communication interface between the battery management system and a plurality of battery modules of a battery pack, such that communication between the battery management system and remaining battery modules of the plurality of battery modules is disrupted, the battery management system configured to manage a specified number of battery modules of the battery pack;
- operatively coupling a jumper to the communication interface to complete the communication interface between the remaining battery modules and the battery management system after the one or more battery modules are disconnected from the communication interface;
- operatively coupling an adapter to the battery management system, the adapter having a predetermined configuration corresponding to a number of the remaining battery modules, the adapter instructing the battery management system that a number of battery modules of the battery pack is equal to a remaining number of battery modules in the battery pack after the one or more battery modules have been disconnected, thereby reactivating the battery management system; and
- charging each remaining battery module in the battery pack to any voltage within a nominal voltage range after reactivating the battery management system.

2. The method as in claim 1, further comprising:

- charging one or more replacement battery modules to any voltage within the nominal voltage range;
- instructing the battery management system that the number of battery modules in the battery pack is equal to the number of remaining battery modules plus the one or more replacement battery modules subsequent to charging the one or more remaining battery modules in the battery pack to the nominal voltage; and
- connecting the one or more replacement battery modules to the battery pack after instructing the battery management system that the number of battery modules in the battery pack is equal to the number of remaining battery modules plus the one or more replacement battery modules.

3. The method as in claim 2, wherein instructing the battery management system that the number of battery modules in the battery pack is equal to the number of remaining battery modules plus the one or more replacement battery modules comprises:

- disconnecting the adapter from the battery management system; and
- disconnecting the jumper from the communication interface.

4. The method as in claim 1, wherein the nominal voltage range is 250 millivolts less than a nominal voltage to 250 millivolts greater than the nominal voltage.

5. A method for replacing a battery module of a battery pack when failure of the one or more battery modules causes a battery management system controlling the battery pack to deactivate thereby preventing the battery management system from charging the battery pack, the method comprising:

- disconnecting the battery module from a communication interface between the battery management system and a plurality of battery modules of a battery pack, such that communication between the battery management system and remaining battery modules of the plurality of battery modules is disrupted, the battery management system configured to manage a specified number of battery modules of the battery pack;
- operatively coupling a jumper to the communication interface to complete the communication interface between the remaining battery modules and the battery management system after the one or more battery modules are disconnected from the communication interface;
- operatively coupling an adapter to the battery management system, the adapter having a predetermined configuration corresponding to a number of the remaining battery modules, the adapter instructing the battery management system that the battery pack comprises one less battery module, thereby reactivating the battery management system; and
- charging each remaining battery module in the battery pack to any voltage within a nominal voltage range after reactivating the battery management system.

6. The method as in claim 5, further comprising:

- charging a replacement battery module to a voltage within the nominal voltage range;
- instructing the battery management system, after charging each remaining battery module in the battery pack to a voltage within the nominal voltage range, that the battery pack comprises one more battery module; and
- connecting the replacement battery module to the battery pack after instructing the battery management system that the battery pack comprises the one more battery module.

7. The method as in claim 6, wherein instructing the battery management system that the battery pack comprises the one more battery module comprises:

- disconnecting the adapter from the battery management system; and
- disconnecting the jumper from the communication interface.

8. The method as in claim 6, wherein connecting the replacement battery module to the battery pack comprises:
- connecting the replacement battery module in parallel with each battery module of the battery pack; and
- operatively coupling the replacement battery module to the battery management system of the battery pack.

9. A method for replacing one or more battery modules of a battery pack when failure of the one or more battery modules causes a battery management system controlling the battery pack to deactivate thereby preventing the battery management system from charging the battery pack, the method comprising:
- charging one or more replacement battery modules to any voltage within a nominal voltage range;
- disconnecting the one or more battery modules from a communication interface between the battery management system and a plurality of battery modules of a battery pack, such that communication between the battery management system and remaining battery modules of the plurality of battery modules is disrupted, the battery management system configured to manage a specified number of battery modules of the battery pack;
- operatively coupling a jumper to the communication interface to complete the communication interface between the remaining battery modules and the battery management system;
- operatively coupling an adapter to the battery management system, the adapter instructing the battery management system that a number of battery modules of the battery pack is equal to a remaining number of battery modules in the battery pack after the one or more battery modules have been disconnected, thereby reactivating the battery management system;
- charging each remaining battery module in the battery pack to any voltage within the nominal voltage range after coupling the jumper to the communication interface and the adapter to the battery management system;
- disconnecting the jumper and the adapter; and
- connecting the one or more replacement battery modules to the battery pack after disconnecting the jumper and the adapter.

10. The method as in claim 9, wherein the nominal voltage range is 250 millivolts less than a nominal voltage to 250 millivolts greater than the nominal voltage.

* * * * *